United States Patent
Hayes et al.

(10) Patent No.: US 7,392,044 B2
(45) Date of Patent: Jun. 24, 2008

(54) WIRELESS APPLIANCE COMMUNICATION WITH DETECTION AND CAPTURE ALGORITHM

(75) Inventors: Bobby Hayes, Louisville, KY (US); Lisa M. Levy, Hendersonville, TN (US); Mizanur Rahman Khan Chowdhury, Saint Cloud, MN (US); John Rudolph, Antiock, TN (US); Robert Alan McCoy, Franklin, TN (US)

(73) Assignee: Electrolux Home Products, Inc., Cleveland, OH (US)

( * ) Notice: Subject to any disclaimer, the term of this patent is extended or adjusted under 35 U.S.C. 154(b) by 167 days.

(21) Appl. No.: 11/116,464

(22) Filed: Apr. 28, 2005

(65) Prior Publication Data

US 2005/0245194 A1 Nov. 3, 2005

Related U.S. Application Data

(60) Provisional application No. 60/565,895, filed on Apr. 28, 2004.

(51) Int. Cl.
*H04M 3/00* (2006.01)
(52) U.S. Cl. .............. 455/420; 455/419; 455/412.2; 455/423; 455/67.13; 375/238
(58) Field of Classification Search .......... 455/420, 455/419, 412.2, 423, 67.11, 67.13, 114.2
See application file for complete search history.

(56) References Cited

U.S. PATENT DOCUMENTS

| | | | |
|---|---|---|---|
| 5,052,027 A | 9/1991 | Poklemba et al. | |
| 5,349,701 A | 9/1994 | Lobel | |
| 5,530,435 A * | 6/1996 | Toms et al. | 340/825.52 |
| 5,802,467 A * | 9/1998 | Salazar et al. | 455/420 |
| 5,995,567 A | 11/1999 | Cioffi et al. | |
| 6,041,240 A * | 3/2000 | McCarthy et al. | 455/464 |
| 6,211,796 B1 * | 4/2001 | Toms et al. | 340/825.49 |
| 6,255,975 B1 | 7/2001 | Swanson | |
| 6,317,468 B1 | 11/2001 | Meyer | |
| 6,606,360 B1 * | 8/2003 | Dunning et al. | 375/354 |
| 6,683,908 B1 | 1/2004 | Cleveland | |
| 6,807,463 B1 * | 10/2004 | Cunningham et al. | 700/304 |
| 6,834,079 B1 * | 12/2004 | Strait et al. | 375/232 |
| 7,058,881 B2 * | 6/2006 | Chu | 714/807 |
| 2001/0005395 A1 * | 6/2001 | Jin | 375/224 |
| 2002/0024425 A1 * | 2/2002 | Chiriatti | 340/310.01 |
| 2002/0061081 A1 | 5/2002 | Richards et al. | |
| 2003/0021367 A1 | 1/2003 | Smith | |
| 2003/0067969 A1 * | 4/2003 | Choi et al. | 375/148 |
| 2003/0182613 A1 * | 9/2003 | Chu | 714/758 |
| 2005/0245194 A1 * | 11/2005 | Hayes et al. | 455/63.1 |
| 2006/0068709 A1 * | 3/2006 | Hafeez | 455/63.1 |

* cited by examiner

*Primary Examiner*—Matthew Anderson
*Assistant Examiner*—Minh Dao
(74) *Attorney, Agent, or Firm*—Pearne & Gordon LLP

(57) ABSTRACT

A communication arrangement for a household appliance device. The arrangement includes a first communication part including a transmitter for transmitting a wireless signal, and a second communication part, remotely located from the first communication part, including a receiver for receiving the wireless signal. One of the first and second communication parts is associated with the appliance device. In one aspect, the second communication part includes a processor to process the signal and nullify the effects of noise transmitted in the signal. In one aspect, the signal is an RF signal, and the second communication part includes means to over sample the signal.

14 Claims, 2 Drawing Sheets

WIRELESS APPLIANCE COMMUNICATION WITH DETECTION AND CAPTURE ALGORITHM

This application claims the benefit of U.S. Provisional Patent Application No. 60/565,895 filed on Apr. 28, 2004.

FIELD OF THE INVENTION

The present invention relates to wireless communication for a household appliance and also relates to data transmission for the communication. In one aspect, the present invention relates to digital data transmission within a radio frequency (RF) communication signal that is transmitted such that signal noise may interfere with the RF signal.

BACKGROUND OF THE INVENTION

Household appliances have been in use for so long and have become so common place that the use and operation of household appliances are generally taken for granted. Also, ever increasingly, people are very busy. As such, people are typically not near an appliance when the appliance is operating. For example, a person is likely not to be present during operation of a washer or dryer. As another example, a freezer or extra refrigerator is often placed in a part of a house, such as a basement, that may not be visited with regular frequency. Also, it is known that appliances, such as refrigerators and freezers, are intended to cycle into active operation as needed effectively indefinitely regardless of the presence of a person. Also, in general, consumers are ever increasingly desiring improvements concerning information provision, operation ability, and ease of operation.

RF signal communication is commonplace and is used in many forms and applications. However, one problem associated with the transmission of an RF signal is that noise often interferes with the signal thus making the signal difficult to decipher. Noise may be generated by two sources. The noise may be generated by the signal itself (internal noise) or the noise may be generated by an outside source (external noise). A digital signal is comprised of a series of pulses provided by changes between low and high values (i.e., 0 or 1). The presence, absence, occurrence, duration, etc. of the pulses convey information. In order for a receiving device to determine the digital values conveyed by the string of pulses, the receiver must be able to discern the existence (e.g., the occurrence, duration, etc.) of the pulses. Noise (either internal or external) received with the desired signal causes difficulties in the ability to properly discern/decipher the content of the transmitted signal.

Thus, there are needs for improved communication ability with household appliances. Also, there are needs to provide a method or algorithm for deciphering the content of the signal despite the presence of noise. The present invention provides solutions to such needs. For example, the present invention overcomes one disadvantage by providing a method for correcting/nullifying the noise. The method comprises a process of over-sampling each bit in a transmission packet to provide for correction/nullification of the noise.

BRIEF SUMMARY OF THE INVENTION

In accordance with one aspect, the present invention provides a communication arrangement for a household appliance device. The arrangement includes a first communication part including a transmitter for transmitting a wireless signal, and a second communication part, remotely located from the first communication part, including a receiver for receiving the wireless signal. One of the first and second communication parts is associated with the appliance device.

In accordance with another aspect, the present invention provides a communication arrangement for a household appliance device. The arrangement includes a first communication part including a transmitter for transmitting a wireless signal, and a second communication part, remotely located from the first communication part, including a receiver for receiving the wireless signal. One of the first and second communication parts is associated with the appliance device, and the second communication part includes a processor to process the signal and nullify the effects of noise transmitted in the signal.

In accordance with another aspect, the present invention provides a communication arrangement, for a household appliance device, which detects and nullifies noise in an RF signal. The arrangement includes a first communication part including a transmitter for transmitting a wireless signal, and a second communication part, remotely located from the first communication part, including a receiver for receiving the wireless signal. One of the first and second communication parts is associated with the appliance device, and the second communication part includes means to over sample the signal.

Additional benefits and advantages of the present invention will become apparent to those skilled in the art to which it pertains upon a reading and understanding of the following detailed specification.

BRIEF DESCRIPTION OF THE DRAWINGS

The forgoing and other features and advantages of the present invention will become apparent to those skilled in the art to which the present invention relates upon reading the following description with reference to the accompanying drawings, wherein.

DESCRIPTION OF AN EXAMPLE EMBODIMENT

Figure 1:
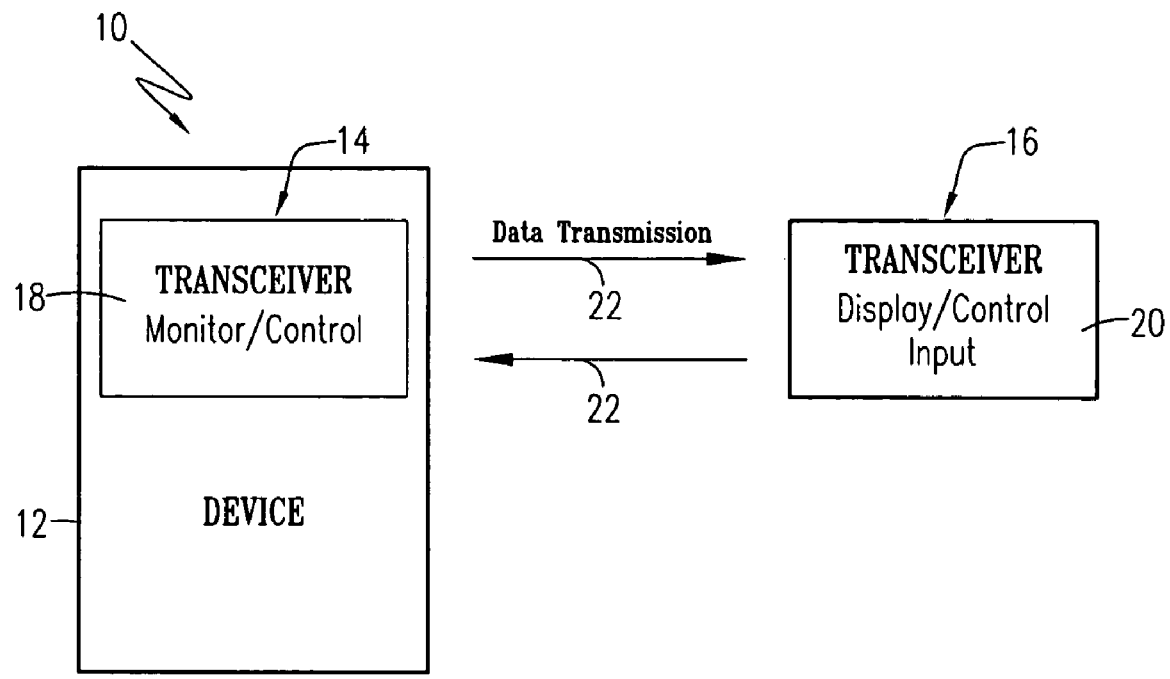
FIG. 1 is a functional block diagram showing one example of a control arrangement for a device in accordance with the present invention.

Referring now to the drawings, FIG. 1 shows an example embodiment of a communication arrangement 10 that utilizes an example of a methodology or algorithm in accordance with one aspect of the present invention. More specifically, the example of FIG. 1 shows a communication arrangement 10 for a household appliance device 12. The appliance device 12 may be any appliance, such as a refrigerator, a freezer, a cooking device (e.g., range, oven or microwave), a washing device (e.g., a clothing washer or a dish washer), a drying device (e.g., a clothing dryer), etc. It is to be appreciated that the present invention may be utilized with other appliance types. As such, the appliance type is not intended to limit the scope of the present invention.

The communication arrangement 10 includes multiple parts. In the example embodiment shown in FIG. 1, the communication arrangement 10 has a first communication part 14 and a second communication part 16. It should be appreciated that the communication arrangement 10 shown in FIG. 1 is not intended to limit the scope of the present invention and is only for illustrative purposes.

The first communication part 14 of the communication arrangement 10 comprises a monitoring/control device 18 and is associated with the appliance device 12. It is to be appreciated that the first communication part 14 of the communication arrangement 10 may be associated with the appliance device 12 in any manner. For example, the first communication part 14 of the communication arrangement 10 may be integrated into the appliance device 12, may be located near or adjacent to the appliance device 12 connected with suitable interconnections, etc. As such, the physical location of the first communication part 14 of the communication arrangement 10 with respect to the appliance device 12 is not intended to limit the scope of the present invention.

The monitoring/control device 18 may be any type of monitoring/control device known in the art and may monitor, control and/or process specific information and/or functions within the appliance device 12. For example, a portion of the monitoring/control device 18 may monitor one or more functional conditions of the appliance device and/or a portion of the monitoring/control device 18 may control one or more functions of the appliance. Examples of functional conditions include, but are not limited to, status concerning ON/OFF, power supply, cycle, temperature, etc. Examples of functions include, but are not limited to, operation associated with at least some of the afore mentioned functional conditions.

Also for example, a portion of the monitoring/control device 18 may process sensory information (e.g., information concerning the operation of the appliance such a sensed temperature within the appliance). Thus, the monitoring control device 18 may include a processor known in the art, such as a microprocessor, to process. Also, a portion of the monitoring/control device 18 may be connected to sense and/or control any aspect of the appliance (e.g., temperature). As yet another example, the monitoring/control device 18 may include an information input portion.

The first communication part 14 includes a portion that transmits and/or receives a signal transmitted across open air space and communicates with the second communication part 16 of the communication arrangement 10 as illustrated by the arrows 22 in FIG. 1. It is to be appreciated that one or both of the first and second communication parts may include a transceiver. In one example, transmission structure includes a Microchip frPIC12F675H transmitter. Also in one example, signal transmission is at 900 MHz. Still further, a matching network can be used to optimize power. On the issue of optimization, it is possible to position one or both of the first and second communication parts in an effort to obtain optimum communication ability. For example, the first communication part 16 may be placed at a particular location on the appliance device 12.

Also, the monitoring control device 18 may include a processor, possibly the same or a different processor than the previously mentioned processor, for processing information (e.g., either monitor and/or control information) received via transmission or provided for transmission. However, it is to be appreciated that the monitoring control device 18 may not have a processor that processes information (e.g., concerning either monitor and/or control information).

In one example, the processor may be in communication with a processor that controls the function of the appliance device 12. For example, a temperature control processor. Communication between these processors can be via a serial link bus.

The second communication part 16 of the communication arrangement 10 comprises a display/control input device 20. The display/control input device 20 may be any type of display/control input device known in the art and may display and/or process information and/or handle control input for controlling specific functions of the appliance device 12. Thus, the display/control input device 20 may include a processor known in the art such as a microprocessor. For example, a portion of the display/control input device 20 may display sensory information received from the first communication part 14 of the communication device 10 concerning the operation of the appliance (e.g., the temperature within the appliance). Furthermore, the display/control input device 20 may transmit input control information to the first communication part 14 of the communication arrangement 10 to control any aspect of the appliance (e.g., control of the temperature within the appliance).

As such, the display/control input device 20 includes a portion that transmits and/or receives a signal transmitted across an open air space such as a transceiver as shown in FIG. 1 that communicates with the first communication part 14 of the communication arrangement 10 as illustrated by the arrows 22 in FIG. 1.

Information display may be in the form of audible and/or visual and/or other display formats. For example, a liquid crystal or light-emitting diode arrangement may be used. Also for example, a speaker may be used.

Information input may be by any means and/or components. For example, a user interface, such a touch pad or touch screen, may be used.

The second communication part 16 of the communication arrangement 10 is remotely located with respect to the first communication part 14 and the associated appliance device 12. It is to be appreciated that the concept of remotely located is to be broadly interpreted. The remote location of the second communication part 16 may be at any distance from the appliance device 12. For example, the appliance device 12 and the first communication part 14 of the communication arrangement 10 may be located within a room of a building and the second part 16 of the communication arrangement 10 may be located at another location within the building (e.g., a different room on a different building floor) or even at a location outside of the building. Thus, the transmission distance between the first and second communication parts 14 and 16 of the communication arrangement 10 is not intended to limit the scope of the present invention. Also, the second communication part may be fixed (e.g., wall-mounted) or portable (e.g., carried on a person).

Figure 2:
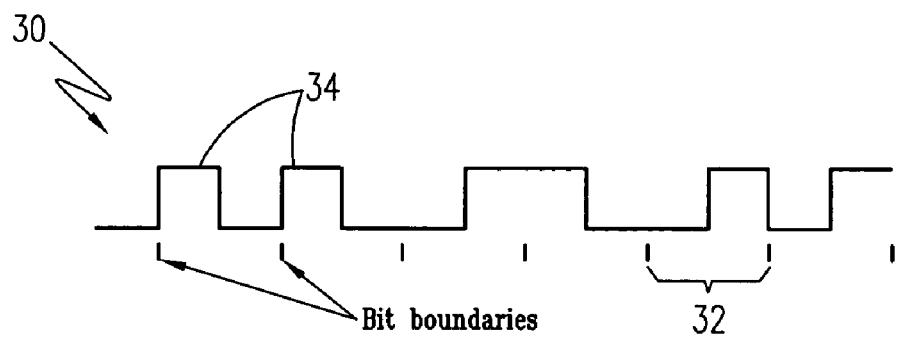
FIG. 2 is an example of a digital signal in accordance with the present invention.

Referring to FIGS. 1 and 2, as previously mentioned, the signal transmitted between the first communication part 14 and the second communication part 16 of the communication arrangement 10 is transmitted across open space. In the example embodiment, the signal transmitted between the first and second communication parts 14 and 16 of the communication arrangement 10 may be a digital signal 30 transmitted via a radio frequency (RF) signal. In one example, the digital signal includes a series of bits 32 that represent a high (e.g., large amplitude) or a low (e.g., low amplitude) value. Thus, the digital signal 30 includes a string of pulses 34. The digital signal 30 may use any type of binary encoding known in the art such as non-return to zero (NRZ) encoding, Manchester encoding, etc. An example of a Manchester encoded digital signal 30 in accordance with one aspect of the present invention is shown in FIG. 2. It should be appreciated that the example signal shown in FIG. 2 is intended for illustrative purposes only and is not intended to limit the scope of the invention. Typically, in Manchester Encoding a logic 0 is indicated by a transition at the center of the bit 32 from a low value to a high value, and a logic 1 is indicated by a transition at the center of the bit 32 from a high value to a low value. However, the converse may be true where a logic 0 is indicated by a transition from a high value to a low value and a logic 1 is indicated by a transition of the pulse form a low value to a high value. Manchester Encoding is commonly known in the art and need not be explained in further detail.

Each pulse 34 in the digital signal 30 is used to provide information to the receiving device (e.g., either 14 or 16). For example, the presence, absence, duration, etc. of each pulse 34 is utilized to convey information to the receiving device. However, as previously mentioned, the digital signal 30 transmitted between the first 14 and second 16 communication parts of the communication arrangement 10 may be subject to either internal or external noise generated from various sources thus making it difficult for the receiving device to decipher the signal. In other words, the presence of noise may cause an erroneous determination that a pulse 34 either exists or does not exist or has terminated. The present invention provides an over-sampling method of each bit 32 to obtain a large number of samples of that bit 32 to identify and correct/ nullify the effect of noise. More specifically within the duration (time period) of the pulse/non-pulse or bit a large number of samples of each bit 32 are taken to determine the characteristics (e.g., presence, absence, duration, etc.) of the pulse 34. For example, if a "0" bit is detected the "0" bit is sampled multiple times within a valid pulse width (time period of the bit 32) to make sure that the value of the bit is "0." If the value of the bit is "0" each time it is sampled is an indication that the information contained in the bit 32 does not contain any noise. On the other hand, if during sampling of the bit 32 a value of "1" is detected is an indication that noise is present in the bit 32. The over-sampling provides a greater amount of sampling data than normal that can be utilized to correct/ nullify one or more data samplings that would otherwise indicate an erroneous pulse. It should be appreciated that the number of samples taken can be any amount that will identify and correct/nullify the effect of noise. For example, the number of samples taken may be 4 or 5 or 6 or 7 or 8 etc. In the example embodiment the number of samples taken is 8.

Figure 3:
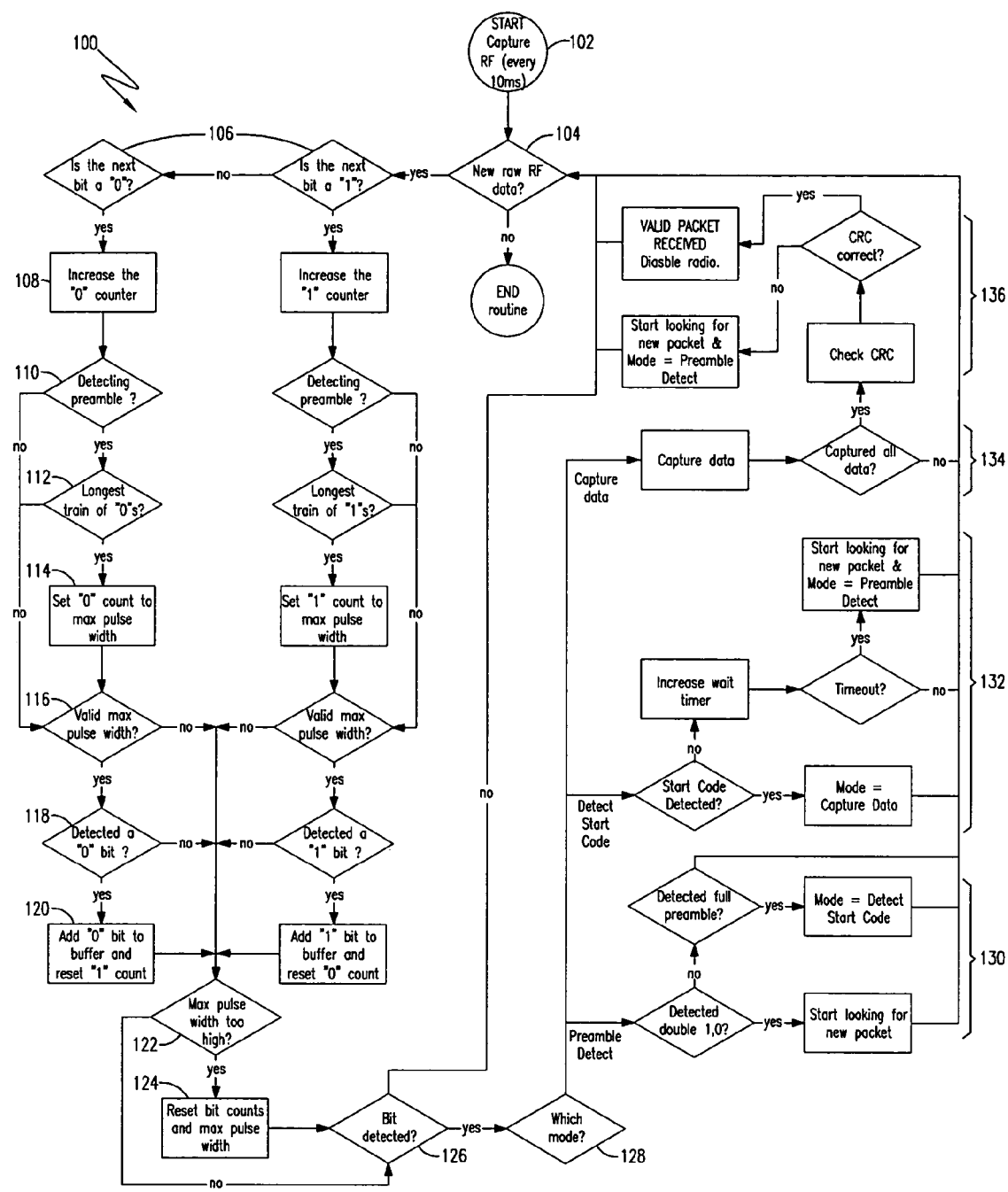
FIG. 3 is a flow chart of an example embodiment of an algorithm in accordance with the present invention.

FIG. 3 is a flow chart/algorithm 100 that represents an example over-sampling process in accordance with one aspect of the present invention. The algorithm 100 can be broken into two parts to facilitate explanation. The left side of the algorithm 100 is comprised of steps 106 through 126 and determines if a valid bit has been detected. The right side of the algorithm 100 is comprised of steps 128-136 and determines the mode or type of bit detected. Steps 102 through 126 will first be described and steps 128-136 will be described thereafter.

Still referring to the example embodiment in FIG. 3, at step 102 the algorithm 100 starts by capturing a RF signal at predetermined time intervals. The capture rate for the algorithm 100 may be any rate to provide an adequate sampling in accordance with the present invention. In the example, the algorithm 100 shown in FIG. 3 has a capture occurrence interval of 10 ms. At step 104 the algorithm 100 determines if the RF data captured is new raw data. If the data is not new, the algorithm 100 ends. If the data is new, the algorithm 100 performs a series of steps 106-126 to determine if a valid bit 32 is detected. The series of steps 106-126 is repeated until an adequate sampling is taken as mentioned above. The repeating of the series of steps 106-126 represents the over-sampling portion of the algorithm 100 in accordance with the present invention and is the process of detecting a bit 32 using Manchester Encoding as described above. It should be appreciated that any type of binary encoded signal known in the art can be used in the algorithm 100 such as, for example, NRZ. To begin, step 106 determines the value of the bit 32. In other words is the bit 32 a "1" or a "0." It should be noted that the steps of processing a "1" or a "0" in determining if the bit 32 is valid are similar and as such only the steps of processing a "0" bit will be explained. Once a "0" bit is detected then step 108 increases a "0" bit counter by one. At steps 110-114 the algorithm 100 then determines if the received signal is a preamble or data. Detection of the preamble or data will be explained further below. Step 116 determines if the pulse 34 is a valid pulse width. The pulse width is the bit time period. Put another way, step 116 determines if the bit time period has passed. If a valid pulse width is not detected, the algorithm proceeds to step 122 and determines if the bit time period has expired. If so, then the bit counters and a timer for measuring the pulse width or bit time period are reset and the algorithm 100 will repeat and take another sample. If a valid pulse width is detected step 118 determines if the value of the bit is a "0." If step 118 is yes, then step 120 stores the "0" bit in a buffer for further processing and resets a "1" bit counter. However, if step 118 is no, indicates that a value of "1" has been detected. The detection of a "1" indicates that the sample taken may be noise and the sample will be discarded. Before repeating the over-sampling process, step 122 determines if the pulse width is too high or as mentioned above if the bit timer has expired. If yes, then the bit counters and the timer for measuring the pulse width or bit time period are reset and the algorithm 100 will proceed to sample the next bit 32. If the pulse width is too high the counter will reset the bit count. If the pulse width is not too high then step 126 determines if a bit was detected. If not, then the algorithm 100 starts over. As previously mentioned, the series of steps 106-126 are repeated until an adequate number of samplings are obtained.

The right side of the algorithm 100 comprising steps 128-136 will now be explained. Once an adequate number of samplings are obtained in accordance with the present invention, step 128 confirms the mode or type of bit 32 detected. The different modes comprise a preamble step 130, a start code step 132 and actual data step 134. The purpose of the preamble is to inform the receiving device that a new RF packet is being introduced and to allow the processor synchronize to a clock of the RF packet. The preamble typically comprises multiple bits of alternating 1's and 0's. The number of bits required can be any number known in the art. In the example algorithm 100 the number of bits is four. Thus in one example, at step 130 the detection of a multibyte sequence of alternating bits (e.g., 4 byte sequence of 1, 0, 1, 0 . . . ) indicates that the full preamble has been detected and informs the receiving device that a new RF packet is being transmitted. It should be appreciated that the preamble helps to stabilize the communication. Once the full preamble has been detected the algorithm 100 proceeds to step 132 to look for the start code. The start code comprises multiple bits, typically two, and marks the end of the preamble and the beginning of the actual data. In one example, the start code is 0x2C2B. If the start code has not been detected, the packet will be ignored and the algorithm 100 will look for the next preamble. If a start code has been detected, the algorithm proceeds to step 134 to capture data for processing. If all the data has not been captured, the algorithm 100 repeats. If all the data has been captured, the algorithm 100 proceeds to step 136 to perform a cyclic redundancy check (CRC). The CRC checks to make sure that the information contained in the packet sent from the transmitter is the same information received by the receiver. The method of performing a CRC is known in the art and will not be further explained. If the CRC is not correct the algorithm 100 will look for a preamble to detect a new packet of information. If the CRC is correct the algorithm 100 confirms that a valid packet of information has been received and thus processes the information and disables the transmission of the signal.

It should be noted that individual transmitter devices can have individual identifications. Also, it is to be appreciated that information data size may be varied. A data size indicator can be utilized. Information data that is transmitted may of course be varied. For example, with regard to an appliance device that is a freezer, the information may be directed to temperature, door open status, power loss, battery status, fast freeze status, ON/OFF status, error checking, etc. Lastly, various features concerning wireless transmission, such as a frame checking sequence, can be employed. For example, standard ITU-TSS can be used.

While specific embodiments of the invention have been described and illustrated, it is to be understood that these embodiments are provided by way of example only and that the invention is not to be construed as being limited thereto but only by proper scope of the following claims.

What is claimed is:

1. A communication arrangement for a household appliance device, the arrangement including:
   a first communication part including a transmitter for transmitting a wireless signal; and
   a second communication part, remotely located from the first communication part, including a receiver for receiving the wireless signal, and including means for detecting a bit, which includes:
      means for determining a value of the bit;
      means for increasing a bit count associated with the value of the bit;
      means for detecting a mode of the bit;
      means for determining a pulse width validity;
      means for storing the bit in a buffer; and
      means for resetting a bit counter associated with another value of the bit;
   wherein one of the first and second communication parts is associated with the appliance device, and
   wherein the second communication part includes means to over sample the signal by repeating operation of the means for detecting a bit, in order to nullify the effects of noise transmitted in the signal.

2. A communication arrangement as set forth in claim 1, wherein the signal is an RF signal, and the second communication part includes a processor to process the signal.

3. A communication arrangement as set forth in claim 2, wherein the first communication part is associated with the appliance device and includes means for monitoring the appliance device, and the second communication part includes means for displaying information concerning the appliance device.

4. A communication arrangement as set forth in claim 2, wherein the second communication part is associated with the appliance device and includes means for controlling the appliance device, and the first communication part includes means for inputting control information.

5. A communication arrangement as set forth in claim 1, wherein each of the first second communication parts includes a transceiver.

6. The communication arrangement of claim 1, wherein the appliance device includes one of a refrigerator, a freezer, a cooking device, and washing device, or a drying device.

7. A communication arrangement for a household appliance device, the arrangement including:
   a first communication part including a transmitter for transmitting a wireless signal; and
   a second communication part, remotely located from the first communication part, including a receiver for receiving the wireless signal and further including means for detecting a bit, which includes:
      means for determining a value of the bit;
      means for increasing a bit count associated with the value of the bit;
      means for detecting a mode of the bit;
      means for determining a pulse width validity;
      means for storing the bit in a buffer; and
      means for resetting a bit counter associated with another value of the bit;
   wherein one of the first and second communication parts is associated with the appliance device, and the second communication part includes a processor to process the signal and, by repeating operation of the means for detecting a bit, nullify the effects of noise transmitted in the signal.

8. A communication arrangement as set forth in claim 7, wherein the signal is an RF signal.

9. A communication arrangement as set forth in claim 7, wherein the first communication part is associated with the appliance device and includes means for monitoring the appliance device, and the second communication part includes means for displaying monitoring information.

10. A communication arrangement as set forth in claim 7, wherein the first communication part is associated with the appliance device and includes means for controlling the appliance device, and the second communication part includes means for inputting control information.

11. A communication arrangement for a household appliance device, the arrangement including:
   a first communication part including a transmitter for transmitting a wireless signal; and
   a second communication part, remotely located from the first communication part, including a receiver for receiving the wireless signal;
   wherein the first communication part is associated with the appliance device and includes means for controlling the appliance device, and the second communication part includes a processor to process the signal and means to over sample the signal in order to nullify the effects of noise transmitted in the signal and further includes means for inputting control information; and wherein the second communication part includes:
   means for detecting a bit, which includes:
      means for determining a value of the bit;
      means for increasing a counter associated with the value of the bit by one;
      means for detecting a mode of the bit;
      means for determining a width of a pulse;
      means for detecting the value of the bit;
      means for storing the bit in a buffer;
      means for resetting a bit counter associated with an another value of the bit; and
      means for determining the width of the pulse;
   wherein the means to over sample include means for repeating operation of the means for detecting a bit.

12. A communication arrangement as set forth in claim 11, further including means for determining a mode of the bit to be one of a preamble, start code or actual date.

13. A communication arrangement as set forth in claim 12, wherein the RF signal has Manchester Encoding.

14. A method for communicating with a household appliance device, the method comprising:

transmitting a wireless signal to a remote location;
receiving the wireless signal at the remote location and detecting a bit, wherein, detecting a bit includes:
   determining a value of the bit;
   increasing a bit count associated with the value of the bit;
   detecting a mode of the bit;
   determining a pulse width validity;
   storing the bit in a buffer; and
   resetting a bit counter associated with another value of the bit; and
over sampling the received signal by repeating the steps for detecting a bit, in order to nullify the effects of noise transmitted in the signal; and
wherein at least one of the transmitting a wireless signal and receiving the wireless signal steps is made through the household appliance device.

* * * * *